United States Patent
Rahman et al.

(10) Patent No.: US 9,107,035 B2
(45) Date of Patent: *Aug. 11, 2015

(54) UPDATING AN OPERATING PARAMETER

(71) Applicant: Verizon Patent and Licensing Inc., Basking Ridge, NJ (US)

(72) Inventors: Iftekhar Rahman, Billerica, MA (US); Eric Wu, Branchburg, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,476

(22) Filed: Feb. 22, 2013

(65) Prior Publication Data
US 2013/0171989 A1     Jul. 4, 2013

Related U.S. Application Data

(63) Continuation of application No. 12/338,163, filed on Dec. 18, 2008, now Pat. No. 8,385,895.

(51) Int. Cl.
*H04W 4/02* (2009.01)
*H04W 8/02* (2009.01)
*H04W 48/18* (2009.01)

(52) U.S. Cl.
CPC ........ *H04W 8/02* (2013.01); *H04W 4/02* (2013.01); *H04W 48/18* (2013.01)

(58) Field of Classification Search
USPC ............. 455/456.3, 414.2, 552.1, 432.1, 434, 455/435.2
See application file for complete search history.

(56) References Cited

U.S. PATENT DOCUMENTS

| | | | |
|---|---|---|---|
| 2004/0152462 A1* | 8/2004 | Hwang | 455/432.1 |
| 2005/0181779 A1 | 8/2005 | Jones et al. | |
| 2005/0277427 A1* | 12/2005 | Zhang | 455/456.1 |
| 2007/0232294 A1* | 10/2007 | Welnick | 455/426.1 |
| 2008/0261603 A1* | 10/2008 | Sever et al. | 455/445 |
| 2009/0036120 A1* | 2/2009 | Kim et al. | 455/432.1 |

\* cited by examiner

*Primary Examiner* — Ariel Balaoing (57) ABSTRACT

A method includes communicating with a first wireless network of a first type, and obtaining a location-based operating parameter from the first wireless network. The method further includes checking the validity of the location-based operating parameter obtained from the first wireless network. If the location-based operating parameter obtained from the first wireless network is not valid, then the method further includes searching for a second wireless network of a second type, and updating the location-based operating parameter from the second wireless network.

22 Claims, 5 Drawing Sheets

UPDATING AN OPERATING PARAMETER

CROSS REFERENCE TO RELATED APPLICATIONS

This application is a continuation of U.S. patent application Ser. No. 12/338,163, filed on Dec. 18, 2008, now U.S. Pat. No. 8,385,895, Issued Feb. 26, 2013, which is hereby incorporated by reference in its entirety.

BACKGROUND INFORMATION

Many mobile devices are capable of operating on different wireless networks. For example, many cellular phones are "multi mode," i.e., capable of operating on two or more different types of wireless networks, such as a code division multiple access (CDMA) network and a global system for mobile communications (GSM) network. While some areas, and even whole countries, may use one type of wireless network, other areas and countries may utilize a different type of wireless network, or even have several network types in the same or different areas.

While a mobile device may be capable of communicating on these different networks, such a mobile device may need to determine or update certain operating parameters in order to operate properly or more seamlessly. For example, such dual mode mobile devices may be capable of using different types of networks in different countries. However, to enable many location-based features, the mobile device may need to determine the country from which it is operating. For example, for a user to call another party residing in another country using phone numbers stored in an address book, the mobile device may need to determine which outgoing country code to use before dialing the stored phone number. While such information may be readily available on one type of wireless network, it may not be available on another.

DETAILED DESCRIPTION

Figure 1:
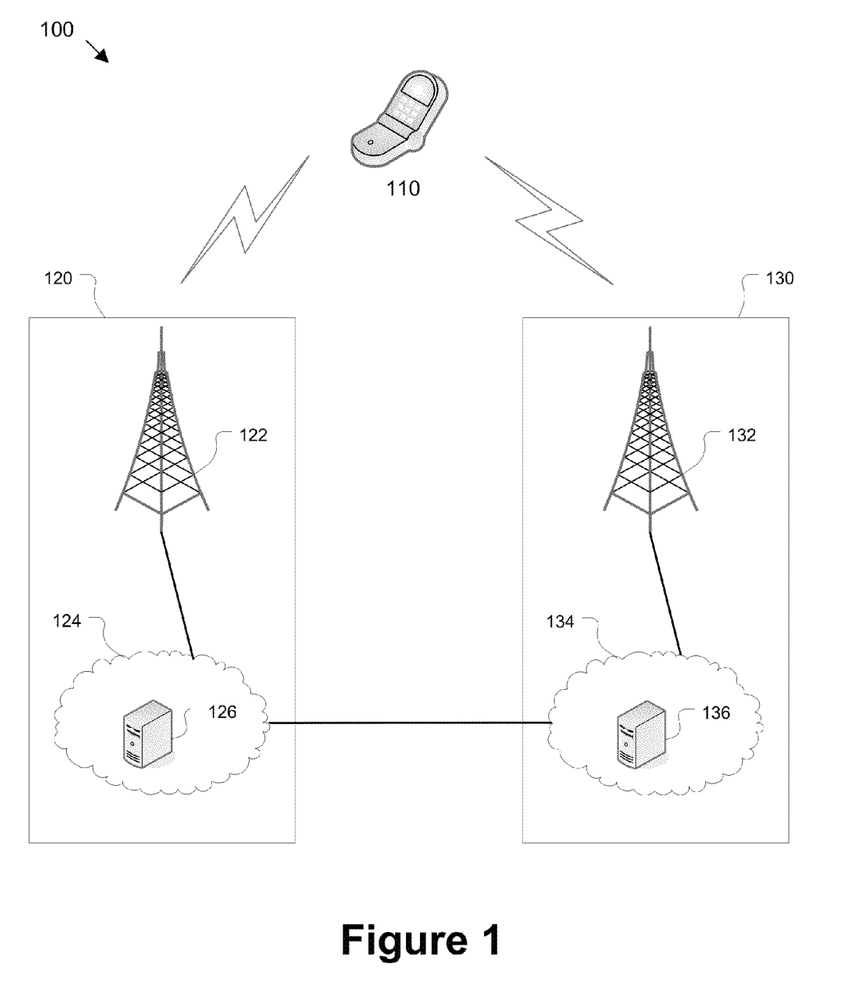
FIG. 1 illustrates an exemplary system for updating an operating parameter.

FIG. 1 illustrates an exemplary system 100 for updating an operating parameter. Typically, system 100 includes a mobile device 110 that is capable of accessing at least two different types of wireless networks 120, 130. Wireless network 120, for example, may be a CDMA wireless network, while network 130 may be a GSM wireless network. As illustrated in FIG. 1, each wireless network 120, 130 typically includes a base station 122, 132, a telecommunications network 124, 134, and a telecommunications server 126, 136. Mobile device 110 operates by accessing a base station 122 that communicates with a telecommunications network 124, allowing mobile device 110 to conduct various voice and data communications with other devices, such as a remote telephone, computer, telecommunications server 126, etc. Similarly, mobile device 110 may also operate by accessing a base station 132 that communicates with a telecommunications network 134, allowing mobile device 110 to conduct various voice and data communications with other devices, such as a remote telephone, computer, telecommunications server 136, etc.

Typically, mobile device 110 registers with an available network, such as wireless network 120 or wireless network 130. Mobile device 110 then typically updates one or more operating parameters by retrieving such one or more desired operating parameters from wireless network 120 or wireless network 130. An operating parameter is typically any parameter, i.e. data, which can be used by mobile device 110. For example, an operating parameter may be location-specific data that indicates a specific country, stat, region, or locality. One example of an operating parameter is a mobile country code (MCC) that identifies the country where wireless networks 120, 130 are located. An operating parameter may also be an area code within a country code, a time zone, a current local time, or some other location or region-specific information that can be used by mobile device 110.

Mobile device 110 may benefit from, or even require, updating an operating parameter in order to enhance or provide certain services to a user. However, in certain circumstances, the particular wireless network 120, 130 that mobile device 110 is registered with may not provide the desired operating parameter. For example, an attempt by mobile device 110 to retrieve a desired operating parameter may be unsuccessful. As discussed in detail below, mobile device 110 may be configured to attempt to retrieve an operating parameter from a first wireless network 120. If the attempt is unsuccessful, mobile device 110 may be further configured to attempt to retrieve the desired operating parameter from a second wireless network 130.

Mobile device 110 is typically any wireless device capable of facilitating voice and/or data communications over wireless networks 120 and 130. Mobile device 110 is typically any portable electronic device that is capable of communicating over at least two different types of wireless networks. For example, mobile device 110 can be a cellular phone, a personal digital assistant, a handled computer, a laptop, or the like. Mobile device 110 is typically capable of utilizing more than one wireless communication protocol in order to access different types of wireless networks. For example, mobile device 110 can be any device that can communicate voice or data over a wireless network 120, 130, such as by communicating with base station 122, 132, using code division multiple access (CDMA), time division multiple access (TDMA), global system for mobile communications (GSM), a Universal Mobile Telecommunication System (UMTS), a Long Term Evolution (LTE), or the like. Additionally, mobile device 110 can also communicate with various devices using such wireless protocols as Bluetooth, WiFi (i.e. IEEE 802.11), ZigBee, Z-Wave, or any other wireless communication protocol.

Mobile device 110 generally communicates with a base station 122, 132 that is within a certain proximity of mobile device 110. Base station 122, 132 typically transmits communication signals from mobile device 110 to a Mobile Telephone Switching Office (MTSO) or packet data node (PDN). Each MTSO/PDN is associated with one or more base stations 122, 132, and each typically handles communications for a plurality of mobile devices 110. Typically, mobile device 110, base stations 122, 132, or the MTSO/PDN will periodically communicate with a telecommunications server 126, 136.

Telecommunications servers 126, 136 can be any type of computing device that typically includes a processor, a memory, and a computer-readable medium. Servers 126, 136 may also include one or more databases for managing data. Servers 126, 136, among other things, can maintain a database of various operating parameters. For example, servers 126, 136 may include data relating to a mobile country code (MCC), a location code, a dialing prefix, or any other operating parameter that could be used by mobile device 110. Generally, such operating parameters are location specific, as they pertain to the country or region where both networks 120, 130 are located. However, such operating parameters may relate to other data as well, and are in no way limited to location-based operating parameters. In addition, although servers 126, 136 are shown connected to telecommunications networks 124, 134 respectively, such servers may be directly connected to base stations 122, 132, and configured to communicate with mobile device 110 through base stations 122, 132.

Mobile device 110 is typically capable of communicating voice and/or data with another device by accessing either network 120 or 130. Typically, mobile device 110 communicates with networks 120 or 130 through base stations 122, 132 using one of any number of different wireless communication technologies. Typically, mobile device 110 is capable of communicating with both networks 120, 130. For example, mobile device 110 may include a wireless communication system that is capable of tuning into different radio frequencies used by different types of wireless networks 120, 130, and also capable of utilizing different wireless communication protocols. Mobile device 110 may also be capable of communicating with both networks 120, 130 simultaneously over different operating frequencies and using different wireless protocols. Mobile device 110 is generally capable of tuning into one or more radio frequencies. For example, mobile device 110 may include two or more radios, enabling mobile device 110 to simultaneously communicate with wireless networks 120, 130.

Telecommunications networks 124, 134 typically include both wired and wireless communication networks, and facilitate voice and data communications between various devices, including mobile device 110. For example, telecommunications networks 124, 134 typically facilitate voice and/or data communications between multiple mobile devices 110, telephones, computers, etc. Telecommunications networks 124, 134 may connect to and/or include a Public Switched Telephone Network (PSTN), a wireless network, satellite communications, or any other network/equipment used to facilitate voice and/or data communications, allowing mobile device 110 to communicate with other devices, and possibly also facilitating communications between telecommunications servers 126, 136 and mobile device 110.

Telecommunications networks 124, 134 may include, but are not limited to, one or more Voice over Internet Protocol ("VoIP") networks, Public Switched Telephone Networks ("PSTNs"), overlay VoIP networks (e.g., a VoIP network overlaid on a PSTN), wireless communication networks (e.g., cellular telephone or satellite pager networks), wireline networks, packet-switched networks, circuit-switched networks, or any combination or subset of the above-listed networks. Telecommunications networks 124, 134 may be configured to carry one or more types of communication signals, including, but not limited to, Internet Protocol signals (i.e., IP-based signals), Time Division Multiplexing (TDM) signals, Session Initiation Protocol (SIP) signals, PSTN signals, wireless signals (e.g., Code Division Multiple Access (CDMA), Time Division Multiple Access (TDMA), and Global System for Mobile communication (GSM) signals), voice signals, and any other communication signals. As further illustrated in FIG. 1, telecommunication networks 124, 134 are typically connected to one another, either directly as shown in FIG. 1, or possibly through one or more other intermediary networks, such as through the Internet, a PSTN, etc.

Mobile device 110 may include any number of applications, programs, features, tools, etc., that can benefit from, or even require, the determination or update of an operating parameter from a wireless network, such as wireless networks 120, 130. For example, mobile device 110 may include one or more location-based applications or services, such as dialing assistance, web-based searching services, roaming services, or the like. Such location-based applications may benefit from, or even require, a location-based operating parameter, such as a country code or area code within a country, in order to provide a particular level of service to a user of mobile device 110. If mobile device 110 is taken from one area to another, updating certain location-based operating parameters may be beneficial to various location-based services. By updating a location-based operating parameter, mobile device 110 can provide services tailored to a specific location without requiring user input regarding a new location.

For example, mobile device 110 may benefit from knowing in which country it is currently operating. Mobile device 110 can update or determine a location-based operating parameter, and then use such a location-based operating parameter for a wide range of services. For example, such a location-based operating parameter may be used for such services as making international voice telephone calls, obtaining driving directions, language translation services, emergency services, etc. As a specific example, a user may desire to use mobile device 110 to perform some language translation. If mobile device 110 automatically obtained a location-based operating parameter, such as a country code, then mobile device 110 could automatically select the native language of that particular country for the user's convenience.

In another example, a user may have difficulties placing international telephone calls while traveling from one country to another. For example, when a user of mobile device 110 travels from one country to another, the user may need to manually change a dialing prefix (i.e. dial string) that are pre-fixed to a telephone number residing in a mobile device's telephone book in order for a telephone call to be routed properly. For example, the International Direct Dial (IDD) prefix is 011 in the United States, but is 00 in Venezuela. In many cases, automatically changing the dialing prefix is not a problem when mobile device 110 accesses a GSM or a Universal Mobile Telecommunication System (UMTS) wireless network. A GSM or UMTS wireless network will automatically add the correct IDD prefix whenever a mobile device 110 adds a "+" symbol before (i.e. prefixed) to a telephone number. Adding the "+" sign to a phone number in a GSM or UMTS network will result in proper international call origination.

However, this is not always the case for CDMA networks, as this is but one example where the CDMA network type differs from other network types, such as GSM or UMTS. A US number when dialed from Venezuela over a CDMA network would need to have the correct IDD prefix pre-appended to the telephone number when mobile device 110 originates the call. One solution would be to change how CDMA networks behave. This solution, however, is problematic because network changes require substantial effort and coordination, universal adoption of a new standard, and proper implementation. Another option, as discussed in detail below, is for mobile device 110 to update or determine an operating parameter from a first network that is of a first network type, such as GSM wireless network 130, and then use that updated operating parameter when accessing a second network type, such as CDMA wireless network 120. Such a solution does not require changing an entire wireless network type, changing a wireless protocol standard, obtaining widespread adoption, or universal implementation.

Modifying mobile device 110 is typically much easer than attempting to modify an entire wireless network type. For example, modifying mobile device 110 to determine an operating parameter from one network type, and then utilize that operating parameter over a second network type, can be accomplished by a wireless network provider, a manufacturer of mobile devices, or even facilitated through a software update or add-on application.

Figure 2:
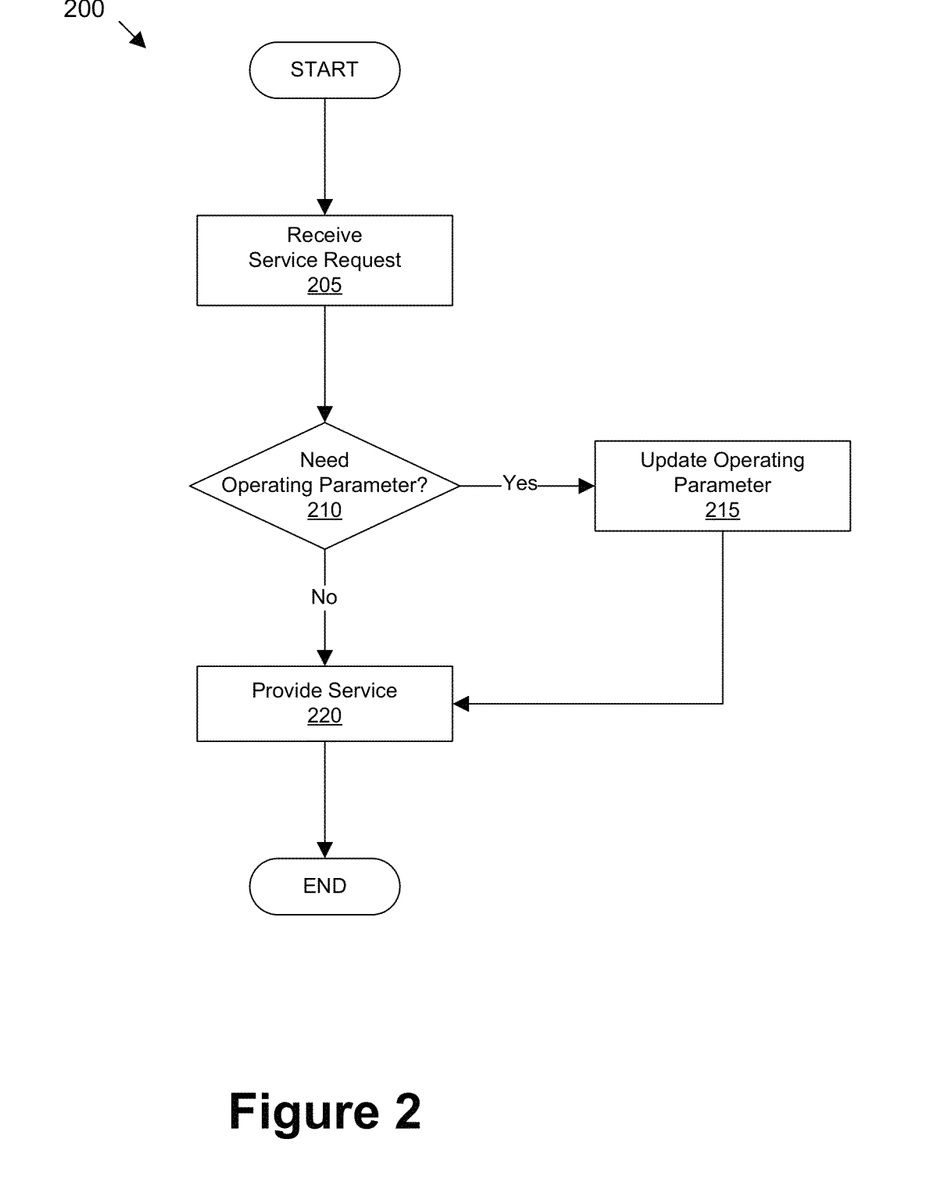
FIG. 2 illustrates an exemplary process for accessing a service.

FIG. 2 illustrates an exemplary process 200 for accessing a service of mobile device 110. Process 200 begins in step 205 when mobile device 110 receives a service request. Typically, mobile device 110 includes one or more user interfaces, allowing a user to interact with mobile device 110. For example, mobile device 110 may be a cellular phone with a keyboard and graphical display. Mobile device 110 may also have a voice activated user interface, allowing a user to request a service through voice commands. A service is typically implemented in software within mobile device 110, and provides some type of functionality to a user. For example, a service can include dialing assistance, such as through dialing a phone number, or accessing a phone number from memory or from a phone/address book. A service may also provide web browsing, driving directions, emergency assistance, location assistance, language translation services, text and picture messaging, email, etc.

Next, in step 210, mobile device 110 determines if an operating parameter should be updated. Mobile device 110 may also identify a desired operating parameter, and also determine that the identified operating parameter should be updated. For example, if a user is attempting to make an international call, mobile device 110 may determine that a location-based operating parameter should be updated. For example, mobile device 110 may require updating a location-based operating parameter, such as a country code, when accessing a wireless network for a first time. Mobile device 110 may also require determining an operating parameter when a user attempts to access a specific service. For example, a user may request emergency services, and mobile device 110 may be programmed to automatically attempt to update a location-based operating parameter to facilitate a request for emergency services. If an operating parameter is required, or if mobile device 110 determines that updating the operating parameter would be beneficial for the requested service, mobile device 110 will proceed to step 215. If no operating parameter is required, or if mobile device 110 determines that the operating parameter was recently updated, then mobile device 110 will proceed to step 220.

In step 215, mobile device 110 attempts to update an operating parameter, discussed in detail below and further illustrated by processes 300, 400, and 500.

In step 220, mobile device 110 provides the requested service. As previously discussed, a service is typically an application or function within an operating system running on mobile device 110 that provides some type of functionality to a user. For example, a game can be a service that does not require the determination or update of an operating parameter before providing the service, i.e. game, to a user. Following step 220, process 200 ends. Process 200 illustrates one example of mobile device 110 deciding whether or not to update an operating parameter based on a request for a service. However, mobile device 110 may attempt to update an operating parameter based on a time interval, when accessing a new wireless network 120, 130, after powering on, or any other programmable event.

Figure 3:
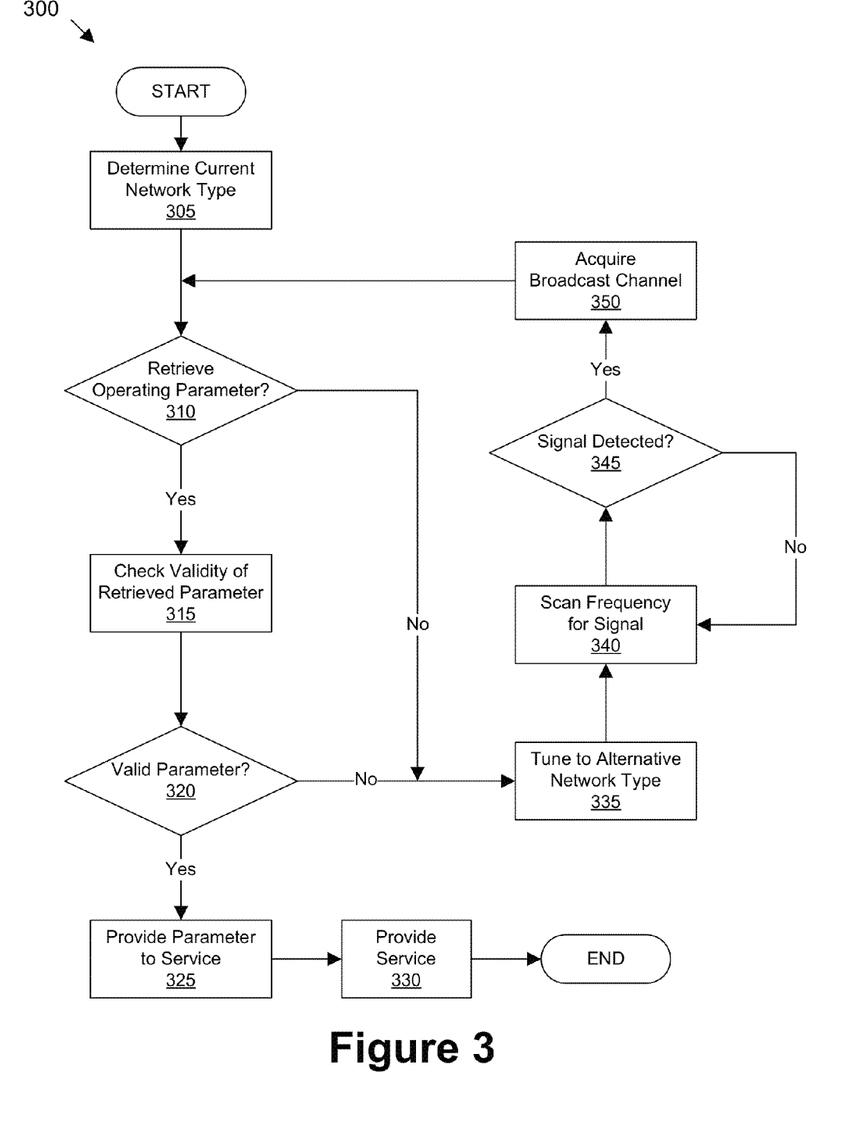
FIG. 3 illustrates an exemplary process for updating an operating parameter.

FIG. 3 illustrates an exemplary process 300 for updating an operating parameter. As previously discussed, wireless networks 120, 130 may be different types of wireless networks. For example, wireless network 120 may be a CDMA wireless network, while wireless network 130 may be a GSM or UMTS wireless network. Mobile device 110 may be capable of communicating with two or more different types of wireless networks, such as networks 120, 130. Mobile device 110 may benefit from retrieving an operating parameter from one wireless network, such as GSM network 130, and using that operating parameter when accessing a second wireless network, such as CDMA network 120. Wireless networks 120, 130 may use different wireless communication protocols, thereby making them different types of wireless networks. While one type of wireless network 130 may provide such an operating parameter, another type of network 120 may not. Therefore, in order to obtain the desired operating parameter, mobile device 110 may be configured to execute process 300. Through process 300, mobile device 110 can potentially obtain an operating parameter from one type of wireless network 130, even when mobile device 110 is registered and using another network 120.

Process 300 begins in step 305 when mobile device 110 determines the type of wireless network with which mobile device 110 is currently communicating. Mobile device 110 may be a multi-mode wireless device capable of communicating with different types of wireless networks. Typically, even where mobile device 110 is capable of communicating with multiple wireless networks, mobile device 110 will only register with one available network. Often times, mobile device 110 will register with a preferred network, such as one supported by a preferred network provider. As used in this example, mobile device 110 is a dual mode wireless device that is capable of communicating with both GSM and CDMA wireless networks. Wireless network 120 may be a CDMA network, and mobile device 110 may initially register with CDMA network 120. In this example, in step 305, mobile device 110 would determine that wireless network 120 is a CDMA type of wireless network.

After registering a wireless network, mobile device 110 can determine the type of wireless network through any number of mechanisms. For example, mobile device 110 may determine the network type during registration, and store that value in memory. In addition, mobile device 110 may query some component or device within a wireless network in order to determine a network type. For example, mobile device 110 may query base station 122, telecommunications network 124, telecommunications server 126, or some other component or device. The communication protocol used by mobile device 110 and a wireless network may also include one or more mechanisms for identifying the type of network. The network type may also be defined by the protocol in use, such as CDMA, GSM, or UMTS, and the protocol in use may include an identifier that indicates which protocol is currently in use.

Next, in step 310, mobile device 110 attempts to retrieve the desired operating parameter. In one example, the desired operating parameter is a location-based area identifier, such a mobile country code (MCC) that identifies a particular country. For example, mobile device 110 may be communicating with network 120, which may be a CDMA wireless network. If mobile device 110 is operating in a CDMA network 120, then mobile device 110 may attempt to determine an operating parameter, such as the current operating country, by reading an extended system parameters message (ESPM) that is sent by CDMA base station 122. Mobile device 110 can then attempt to extract or parse the mobile country code (MCC) from the ESPM. If mobile device 110 is able to retrieve the desired operating parameter, then mobile device 110 proceeds to step 315. If mobile device 110 is unable to retrieve the desired operating parameter, then mobile device 110 proceeds to step 335.

In step 315, mobile device 110 checks the validity of the retrieved operating parameter. For example, some CDMA networks 120 do not properly implement the mobile country code (MCC) in the extended system parameters message (ESPM). Therefore, mobile device 110 may retrieve an invalid mobile country code and be unable to properly determine the operating country. Such could be the case for any desired operating parameter, where the operating parameter is available on one network type, but not available through another type of wireless network.

Mobile device 110 may include a table or database of proper, or properly formatted, operating parameters, and may use the table or database to check the validity of the retrieved operating parameter. Mobile device 110 can then compare the retrieved operating parameter to the locally stored table or database. For example, mobile device 110 could compare the retrieved MCC to a table that includes a listing of all assigned MCCs and the name of the country corresponding to that MCC. If the retrieved MCC is not found in the table stored in mobile device 110, then the MCC will be deemed as invalid. Such a table or database may also include additional information or settings associated with that particular country. For example, when implementing international dialing, such a table or database may include a dialing pre-fix that should be used in a particular country.

Next, in step 320, mobile device 110 checks to see if the retrieved operating parameter is valid. Mobile device 110 may check a locally stored table or database and compare the retrieved operating parameter to a list of acceptable operating parameters. For example, a valid operating parameter may be one that is stored locally, while an invalid operating parameter may one that is not stored locally. In addition, mobile device 110 may check the retrieved operating parameter by querying a telecommunications server 126. If the operating parameter is found to be valid, then mobile device 110 proceeds to step 325. If the operating parameter is found to be invalid, then mobile device 110 proceeds to step 335.

In step 325, mobile device 110 provides the operating parameter to a service. As previously discussed, mobile device 110 may attempt to determine an operating parameter in response to a request from an application or service. However, mobile device 110 may also attempt to retrieve certain operating parameters based on other criteria, such as based on certain time intervals, when mobile device 110 accesses a new wireless network, when mobile device 110 powers on, etc. Additionally, mobile device 110 may provide information to a service based on the retrieved operating parameter. For example, with respect to international dialing, mobile device 110 may provide a dialing application with a proper dialing pre-fix based on a location-based operating parameter, such as a mobile country code that signified the current operating country.

Next, in step 330, mobile device 110 provides the requested service. As previously discussed, a service is typically an application or function within an operating system running on mobile device 110 that provides some type of functionality to a user. Following step 330, process 300 ends.

Mobile device 110 may be unsuccessful at retrieving the operating parameter from a first wireless network. For example, as previously discussed, the operating parameter may be unavailable or invalid (e.g., inconsistent with expected information). If mobile device 110 is unsuccessful at obtaining a valid operating parameter from a first wireless network, then mobile device 110 proceeds to step 335. Beginning in step 335, mobile device 110 attempts to retrieve an operating parameter from at least a second wireless network 130. As previously discussed, wireless network 120 may be a CDMA network, while network 130 may be a GSM or UMTS network. Mobile device 110 may be registered to use CDMA network 120, and attempt to retrieve an operating parameter from network 120. If that attempt is unsuccessful, mobile device 110 may attempt to retrieve the desired operating parameter from GSM network 130.

In step 335, mobile device 110 tunes to an alternative network type. For example, mobile device 110 may start searching for an alternative network by tuning to a radio frequency of GSM network 130. Mobile device 110 may select the alternative network type at random, i.e. from a list of network types that mobile device 110 is capable of accessing. In addition, mobile device 110 may explicitly attempt to access a different network type than was previously accessed.

If mobile device 110 is a dual mode device, there may only be two choices of network types to attempt to access. However, mobile device 110 may be configured to access three or more different network types, and may therefore attempt to retrieve the desired operating parameter from any wireless network type that mobile device 110 is capable of accessing. In addition, mobile device 110 may select the network type based on past success of accessing that type of network, based on past success of retrieving the desired operating parameter, based on a probability of accessing a particular network type (e.g., signal strength), or based on any other programmable criteria such as the fact that an alternative network is associated with the same network provider, etc. Tuning to an alternative network type can include modifying an operating frequency to a frequency within a range that is designated for a particular network type. For example, mobile device 110 may instruct a wireless communication system that includes a radio receiver to switch to another radio frequency (RF) band and scan certain frequencies that are within a band designated by a particular network type, such as GSM/UMTS frequencies.

Next, in step 340, mobile device 110 will scan a particular frequency within a range as designated by a network type, such as GSM network 130, for example. Mobile device 110 may select one particular frequency within a pre-determined range that is designated for a particular network type.

Next, in step 345, mobile device 110 attempts to determine if any radio signal energy is detected, thereby indicating the presence of a wireless network. If no radio energy is detected, then mobile device 110 returns back to step 340 and selects another frequency to scan. If a wireless network is detected through the detection of radio energy, then mobile device 110 continues to step 350.

In step 350, mobile device 110 acquires a broadcast channel of wireless network 130, for example. In such an example, mobile device 110 first retrieved an invalid operating parameter from CDMA network 120, and is now attempting to obtain a valid operating parameter from GSM network 130. Mobile device 110 does not need to register with network 130 to obtain the broadcast channel, however, and can acquire information from network 130 through the broadcast channel.

Next, in step 310, mobile device again attempts to retrieve the desired operating parameter, but now attempts to retrieve the operating parameter from another wireless network, such as GSM network 130. For example, mobile device 110 can obtain an operating parameter from network 130 through the broadcast channel, without registering with network 130. For example, if network 130 is a GSM network, then mobile device 110 can parse out a mobile country code (MCC) from data in the broadcast channel.

After obtaining an operating parameter from the second wireless network, mobile device 110 continues on to step 315 and checks the validity of the retrieved operating parameter. Mobile device 110 will then continue to step 320 and determine if the newly retrieved operating parameter is valid. If the retrieved operating parameter is valid, then mobile device 110 will proceed to step 325. If the parameter is not valid, then mobile device 110 continues on to step 335 and again attempts to retrieve an operating parameter from yet another wireless network. Mobile device 110 can attempt to retrieve the desired operating parameter from another type of wireless network, or attempt to retrieve the parameter from another network of the same type as previously accessed. Following step 325, mobile device 110 provides the requested service in step 330. Following step 330, process 300 ends. Following process 300, mobile device 110 can then tune back to the first wireless network, the wireless network that mobile device 110 originally registered with, such as CDMA wireless network 120.

As illustrated through process 300, mobile device 110 can be configured to register with a first network having a first network type, and attempt to retrieve an operating parameter from the first wireless network. If the operating parameter is unavailable or found to be invalid, mobile device 110 can temporarily tune to at least a second wireless network of a different type to obtain the desired operating parameter. For example, mobile device 110 can be originally registered with a CDMA network 120, but tune away temporarily to a GSM network 130 when the lookup of an operating parameter in CDMA network 120 yields an invalid operating parameter. As illustrated in process 300, mobile device 110 can attempt to retrieve a desired operating parameter from another network without registering with that network, or requesting input from a user.

Figure 4:
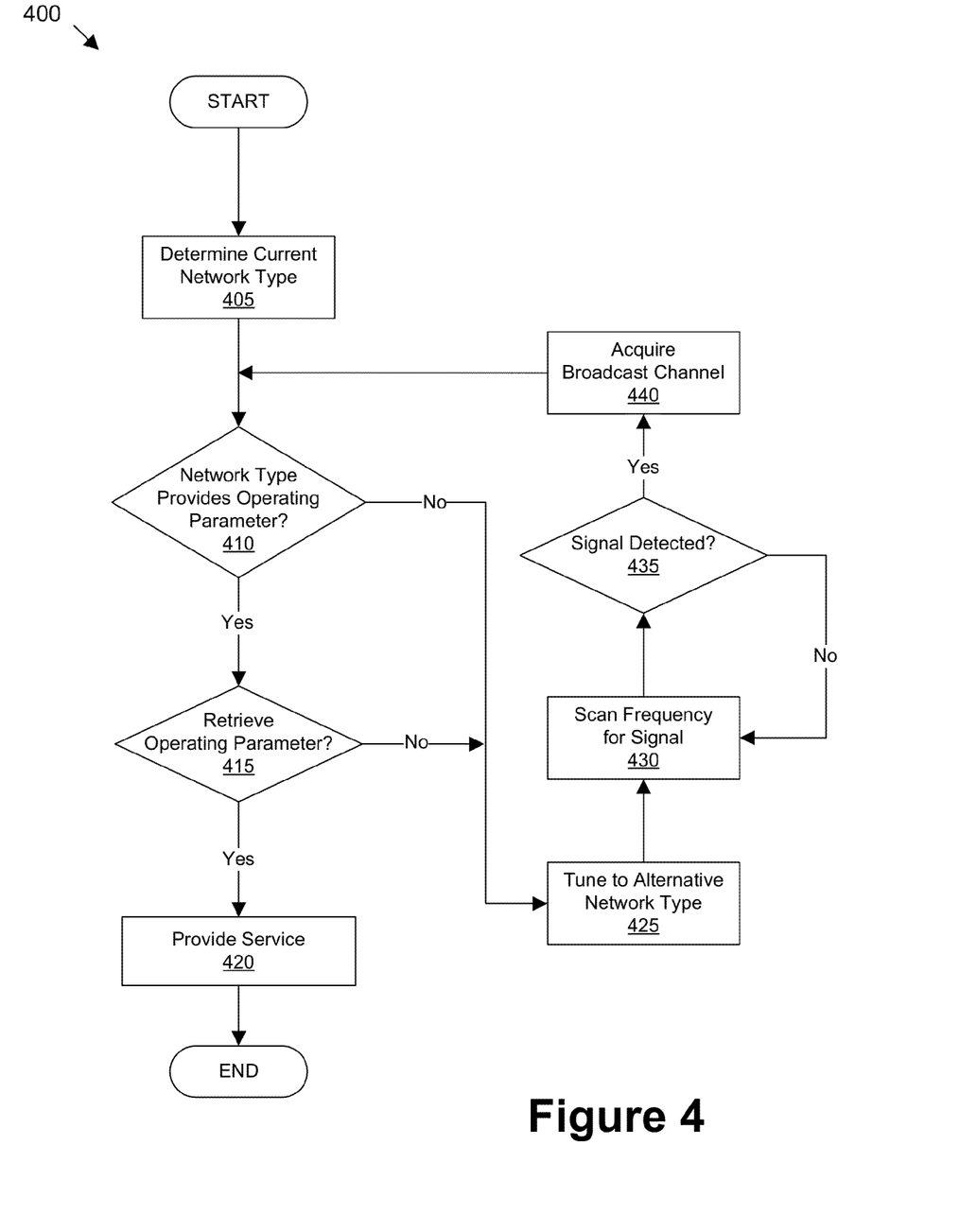
FIG. 4 illustrates another exemplary process for updating an operating parameter.

FIG. 4 illustrates another exemplary process 400 for updating an operating parameter. Mobile device 110 may include a table or database that includes a listing of operating parameters, and data about each operating parameter. For example, mobile device 110 may maintain a list of operating parameters, and the type of wireless network 120, 130 that provides that specific operating parameter. For example, mobile device 110 may be aware that a mobile country code (MCC) is more likely available and valid in a GSM network 130, while obtaining such an operating parameter from a CDMA network 120 may be less likely. Having such locally stored information about an operating parameter can enable mobile device 110 to obtain an operating parameter without checking the validity of the operating parameter, as illustrated by process 400.

Process 400 begins in step 405 when mobile device 110 determines the current wireless network type. As previously discussed, mobile device 110 may register with a preferred wireless network 120, and determine that network 120 is a CDMA network through any number of different mechanisms such as those discussed above.

Next, in step 410, mobile device 110 determines if the current network type provides the desired operating parameter. Mobile device 110 may have a locally stored table or database that stores data about such operating parameters, such as which wireless network type is more or less likely to provide the operating parameter. While some wireless network types may not provide a certain operating parameter at all, others may simply be less likely to provide a valid operating parameter, meaning that the data provided for a particular operating parameter may not be correct. If mobile device 110 determines that the current network type does provide the desired operating parameter, then mobile device 110 proceeds to step 415. If mobile device 110 determines that the current network type does not provide the desired operating parameter, then mobile device 110 proceeds to step 420.

In step 415, mobile device 110 attempts to retrieve the desired operating parameter. If mobile device 110 is able to retrieve the desired operating parameter, then mobile device 110 proceeds to step 420. If mobile device 110 is unable to retrieve the desired operating parameter, then mobile device 110 proceeds to step 425.

In step 420, mobile device 110 provides the requested service. Following step 420, process 400 ends.

In step 425, mobile device 110 tunes to an alternative network type that provides, or is more likely to provide, the desired operating parameter. For example, mobile device 110 may be registered and using CDMA network 120, which is less likely to provide a valid MCC. Mobile device 110 may be aware that a GSM network is more likely to provide a valid MCC, and therefore tune to GSM frequencies in an attempt to retrieve the desired operating parameter from GSM network 130.

Next, in step 430, mobile device 110 scans a radio frequency for a signal. As previously discussed, mobile device 110 can scan a wide range of frequencies in search of radio energy indicated an available network 130, such as a GSM wireless network.

Next, in step 435, mobile device 110 attempts to determine if any radio signal energy is detected, thereby indicating the presence of a wireless network. If no radio energy is detected, then mobile device 110 returns back to step 430 and selects another frequency to scan. If a wireless network is detected through the detection of radio energy, then mobile device 110 continues to step 440.

In step 440, mobile device 110 acquires a broadcast channel signal from the alternative network 130. As discussed with respect to process 300, mobile device 110 can scan multiple frequencies within a frequency range that is designated for a particular wireless network type. Once a wireless network 130 of the desired type is located, mobile device 110 can acquire the broadcast channel from network 130. Following step 440, mobile device continues to step 410 and determines if the network type provides the desired operating parameter.

As illustrated in FIG. 4, mobile device 110 can obtain a desired operating parameter from an alternative network type without first retrieving the desired operating parameter from a first network, and also checking the validity of the operating parameter. Process 400 can be implemented when mobile device 110 knows which network types provide, or are more likely to prove, certain operating parameters. Of course, mobile device 110 may have such information regarding the availability of operating parameters, but may still include process steps for checking the validity of any retrieved operating parameter for quality purposes.

As previously discussed, mobile device 110 is capable of providing various location-based services that may benefit from or even require the updating of a location-based operating parameter. When such location-based services are requested, mobile device 110 may determine a location-based operating parameter, such as a mobile country code corresponding to the country in which mobile device 110 is currently operating. To enable many location-based services, e.g., user assisted dialing and location based web operations, mobile device 110 may benefit from knowing the country in which it is operating. For example, when operating in GSM/UMTS networks, such a location-based operating parameter may be readily available. However, when accessing a CDMA network, such a location-based operating parameter may not be readily available without network assistance.

Figure 5:
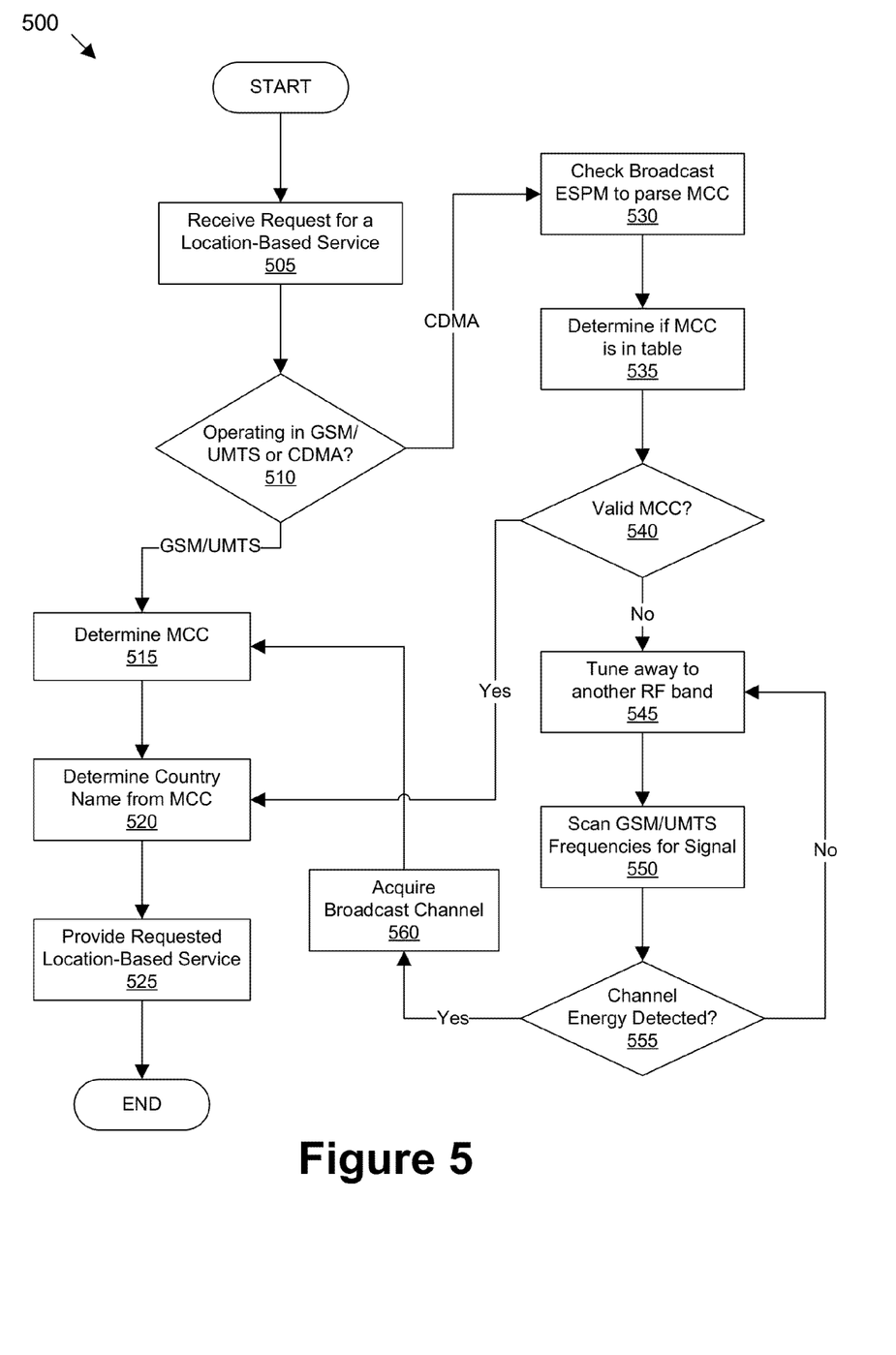
FIG. 5 illustrates another exemplary process for updating a location-based operating parameter.

FIG. 5 illustrates another exemplary process 500 for updating a location-based operating parameter, such as a mobile country code. In one example, a location-based operating parameter is a mobile country code. Further, a location-based operating parameter may be the country in which mobile device 110 is currently operating. Process 500 begins in step 505 when mobile device 110 receives a request for a location-based service. For example, a user may request an assisted dialing application, a location-based web application, or any other service that requires or can benefit from a location-based operating parameter.

Next, in step 510, mobile device 110 determines the type of the wireless network with which it is currently communicating. For example, mobile device 110 can determine whether it is operating in a GSM/UMTS network or a CDMA network. If mobile device 110 determines that it is operating in a GSM/UMTS network, then mobile device 110 proceeds to step 515. If mobile device 110 determines that it is operating in a CDMA network, then mobile device 110 proceeds to step 525.

In step 515, mobile device 110 will determine a mobile country code (MCC). In one example, mobile device 110 determines the MCC by acquiring the GSM/UMTS broadcast channel (BCCH). Mobile device 110 can then utilize the System Information Type 3 messages broadcast on the BCCH by the wireless network. Mobile device 110 can then parse the MCC part of the Location Area Identifier (LAI) obtained from the System Information Type 3 messages. System Information Type 3 messages are specified in 3GPP TS 25.331.

Next, in step 520, mobile device 110 can determine the current country name using the MCC. For example, mobile device 110 may maintain a table or database that associates country names to MCCs. Mobile device 110 can then compare the parsed MCC to the table to determine the country name in which mobile device 110 is operating.

Next, in step 525, mobile device 110 utilizes the country name to provide the requested location-based service to the user. Following step 525, process 500 ends.

In step 530, mobile device 110 reads the Extended System Parameters Message (ESPM) sent by the serving CDMA base station. Mobile device 110 may then parse the Mobile Country Code (MCC) from the ESPM. The Extended System Parameters Message (ESPM) is specified in 3GPP2 C.S0005 Upper Layer (layer 3) Signaling Standard for cdma2000 Spread Spectrum Systems.

Next, in step 535, mobile device 110 determines if the parsed MCC is in the locally stored table associating MCCs with country names. In one example, the table includes at least two columns, where one includes a listing of all assigned MCCs, and the second column includes the name of the corresponding country. Of course, there may be multiple MCCs assigned to a single country.

Next, in step 540, mobile device 110 uses the table to determine if the MCC parsed in step 530 is valid. Generally, a valid MCC is one that is listed in the table. If the parsed MCC is valid, then mobile device 110 will proceed to step 520 and determine the country name associated with the parsed MCC, and provide the requested location-based service in step 525. If mobile device 110 determines that the parsed MCC is not valid, then mobile device 110 proceeds to step 545.

In step 545, mobile device 110 tunes away to another radio frequency (RF) band. For example, mobile device 110 may tune its radio receiver to another RF band. In one example, mobile device 110 tunes to an RF frequency that is within a band of frequencies used by GSM/UMTS wireless networks.

Next, in step 550, mobile device 110 scans GSM/UMTS frequencies for a signal. Generally, such scanning includes attempting to detect signal energy on the tuned frequency.

Next, in step 555, mobile device 110 determines if any radio frequency energy is detected on the scanned frequency. If no energy is detected, then mobile device 110 returns to step 545 and tunes to another frequency within the GSM/UMTS frequency ranges. If energy is detected, then mobile device 110 proceeds to step 560.

In step 560, mobile device 110 acquires the broadcast channel of the GSM/UMTS wireless network. For example, mobile device 110 may include a radio receiver, and utilize the radio receiver to acquire the GSM/UMTS Broadcast Channel (BCCH). Mobile device 110 can then proceed to steps 515-525. As previously discussed with respect to steps 515-525, mobile device 110 can determine the MCC, determine the country name from the MCC, and then provide the requested location-based service to a user. Following step 525, process 500 ends.

As illustrated by process 500, mobile device 110 can communicate with a first wireless network of a first type, such as a CDMA wireless network, but obtain a location-based operating parameter from a second wireless network of a second type, such as a GSM/UMTS wireless network. Mobile device 110 could then return to the first wireless network, namely the CDMA network, and provide the requested location-based service using the first wireless network. As illustrated, mobile device 110 can retrieve an operating parameter from a second wireless network, such as a GSM/UMTS network, sending any data or registering with that network. In addition, mobile device 110 can utilize the received mobile country code to determine the country name in which mobile device 110 is currently operating. By determining the country name, mobile device 110 can provide various location-based services tailored to the current country without requiring a user to select or input the current country.

Certain devices of system 100, such as mobile device 110, servers 126, 136, and other devices mentioned herein may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system and the Vortex operating system distributed by Motorola, Inc. of Schaumberg, Ill. Computing devices may include any one of a number of computing devices that are known, including, without limitation, a computer workstation, a desktop, notebook, laptop, handheld computer, or some other computing device. Certain devices, such as mobile device 110, may use an embedded operating system or a proprietary operating system.

Devices mentioned herein are generally capable of executing instructions stored on a computer-readable medium, such as instructions for performing one or more of the above-identified processes. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor)

receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer, a microcontroller, etc.). Such a medium may take many forms, including, but not limited to, non-volatile media and volatile medial. Non-volatile media may include, for example, optical or magnetic disks, read-only memory (ROM), and other persistent memory. Volatile media may include, for example, dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other tangible medium with patterns of holes, a RAM, a PROM, an EPROM, a FLASH-EEPROM, any other memory chip or cartridge, or any other medium from which a computer can read.

A transmission media may facilitate the processing of instructions by carrying instructions from one component or device to another. For example, a transmission media may facilitate electronic communication between mobile device 110 and telecommunications server 126. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A method, comprising:
   communicating with a first wireless network of a first type;
   obtaining, when available, a location-based operating parameter from the first wireless network, wherein the location-based operating parameter is a mobile country code;
   checking the validity of the location-based operating parameter obtained from the first wireless network; and
   if the location-based operating parameter from the first wireless network is not valid, then:
      searching for a second wireless network of a second type that is different than the first type,
      updating the location-based operating parameter from the second wireless network, and
      providing a dialing service to the first wireless network for initiating a communication based on the location-based operating parameter from the second wireless network.

2. The method of claim 1, wherein the first wireless network is not valid when the location based parameter is unavailable.

3. The method of claim 1, further comprising the network of the second type being determined based at least in part on a past success and using the past success to determine the second type.

4. The method of claim 3, wherein the past success comprises having been able to access a network of the second type.

5. The method of claim 3, wherein the past success comprises having been able to retrieve the location-based operating parameter from a network of the second type.

6. The method of claim 1, wherein the first type is one of a CDMA and a non-CDMA wireless network, and the second type is the other of a CDMA and a non-CDMA wireless network.

7. A method, comprising:
   communicating with a first wireless network of a first type;
   obtaining, when available, a location-based operating parameter from the first wireless network;
   if the location-based operating parameter from the first wireless network is not valid, then:
      updating the location-based operating parameter using a location-based operating parameter from a second wireless network of a second type that is different than the first type, and
      providing a dialing service to the first wireless network for initiating a communication based on the location-based operating parameter from the second wireless network.

8. The method of claim 7, wherein the first wireless network is invalid when the location-based parameter is unavailable.

9. The method of claim 7, further comprising determining the network of the second type based at least in part on a past success with networks of the second type.

10. The method of claim 9, wherein the past success comprises having been able to access a network of the second type.

11. The method of claim 9, wherein the past success comprises having been able to retrieve a desired location-based operating parameter from a network of the second type.

12. The method of claim 7, wherein communicating with the first wireless network includes registering with the first wireless network.

13. The method of claim 7, further comprising updating the location-based operating parameter using a location-based operating parameter from the second wireless network obtained by listening to a broadcast channel and not by sending data to the second wireless network.

14. The method of claim 7, further comprising searching for the second wireless network, wherein the second wireless network is associated with a network provider.

15. A non-transitory computer-readable medium comprising instructions tangibly embodied thereon, the instructions executable by a processor for:
    communicating with a first wireless network of a first type;
    obtaining, when available, a location-based operating parameter from the first wireless network, wherein the location-based operating parameter is a mobile country code;
    checking the validity of the location-based operating parameter obtained from the first wireless network; and
    if the location-based operating parameter from the first wireless network is invalid, then:
        searching for a second wireless network of a second type that is different than the first type,
        updating the location-based operating parameter from the second wireless network, and
        providing a dialing service to the first wireless network for initiating a communication based on the location-based operating parameter from the second wireless network.

16. The method of claim 15, further comprising instructions for determining the network of the second type based at least in part on a past success and using the past success to determine the second type.

17. The medium of claim 16, wherein the past success comprises having been able to access a network of the second type.

18. The medium of claim 17, wherein the past success comprises having been able to retrieve a desired location-based operating parameter from a network of the second type.

19. The medium of claim 15, further comprising a service including providing a dialing service to the first wireless network for initiating a communication based on the location-based operating parameter from the second wireless network.

20. The medium of claim 15, further comprising instructions for updating the location-based operating parameter using a location-based operation parameter from the second wireless network obtained by listening to a broadcast channel and not by sending data to the second wireless network.

21. The medium of claim 15, further comprising instructions for searching for the second wireless network associated with a network provider.

22. The medium of claim 15, wherein the first wireless network is one of a CDMA and a non-CDMA wireless network, and the second wireless network is the other of a CDMA and a non-CDMA wireless network.

* * * * *